US011729158B2

(12) United States Patent
Genner

(10) Patent No.: US 11,729,158 B2
(45) Date of Patent: *Aug. 15, 2023

(54) SYSTEMS AND METHODS FOR IDENTITY VERIFICATION VIA THIRD PARTY ACCOUNTS

(71) Applicant: T Stamp Inc., Atlanta, GA (US)

(72) Inventor: Gareth Neville Genner, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,508

(22) Filed: Aug. 13, 2021

(65) Prior Publication Data

US 2021/0377244 A1 Dec. 2, 2021

Related U.S. Application Data

(63) Continuation of application No. 15/955,270, filed on Apr. 17, 2018, now Pat. No. 11,095,631.

(60) Provisional application No. 62/486,210, filed on Apr. 17, 2017.

(51) Int. Cl.
*H04L 29/06* (2006.01)
*G06Q 50/00* (2012.01)
*G06K 19/06* (2006.01)
*H04L 9/40* (2022.01)

(52) U.S. Cl.
CPC ........ *H04L 63/08* (2013.01); *G06K 19/06028* (2013.01); *G06K 19/06037* (2013.01); *G06Q 50/01* (2013.01); *H04L 63/0861* (2013.01)

(58) Field of Classification Search
CPC . H04L 63/08; H04L 63/086; G06K 19/06028; G06K 19/06037; G06Q 50/01
See application file for complete search history.

(56) References Cited

U.S. PATENT DOCUMENTS

| 8,087,068 | B1* | 12/2011 | Downey | G06F 21/34 |
| | | | | 726/4 |
| 2013/0047223 | A1* | 2/2013 | Headley | H04L 63/18 |
| | | | | 726/5 |
| 2014/0020073 | A1* | 1/2014 | Ronda | H04L 63/0853 |
| | | | | 726/7 |
| 2016/0050199 | A1* | 2/2016 | Ganesan | G06F 21/33 |
| | | | | 726/7 |
| 2017/0171200 | A1* | 6/2017 | Bao | H04L 9/3213 |
| 2018/0048472 | A1* | 2/2018 | Pirrwitz | H04L 63/18 |
| 2018/0077571 | A1* | 3/2018 | Mannopantar | H04W 12/068 |
| 2018/0315105 | A1* | 11/2018 | Gandhi | H04L 9/3271 |
| 2020/0351272 | A1* | 11/2020 | Pelegero | H04L 67/306 |
| 2021/0328988 | A1* | 10/2021 | Hall | H04L 63/0884 |

* cited by examiner

*Primary Examiner* — Darshan I Dhruv
(74) *Attorney, Agent, or Firm* — Morris, Manning & Martin, LLP; Daniel E. Sineway, Esq.

(57) ABSTRACT

Systems and methods for account access/identity verification based on access to a third party account. In various embodiments, the disclosed system facilitates access to a particular account via verification of the identity of the accessing user through control of a third party account. That is, in one embodiment, the system allows a user to access an account if the user can prove that he/she also has access to another account (e.g., via providing a code to the system that was transmitted to the other account).

16 Claims, 3 Drawing Sheets

EXEMPLARY ACCOUNT ACCESS PROCESS – ACCOUNT SYSTEM PERSPECTIVE

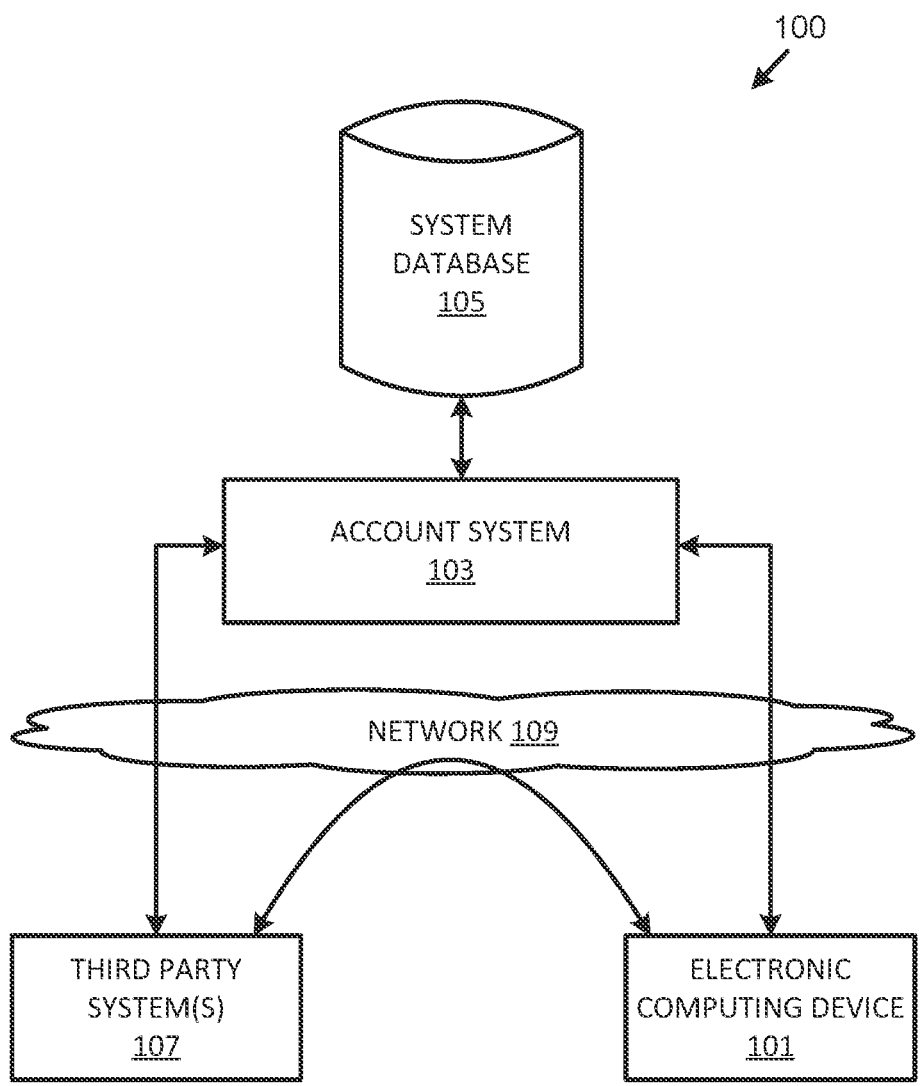
FIG 1: EXEMPLARY SYSTEM ARCHITECTURE

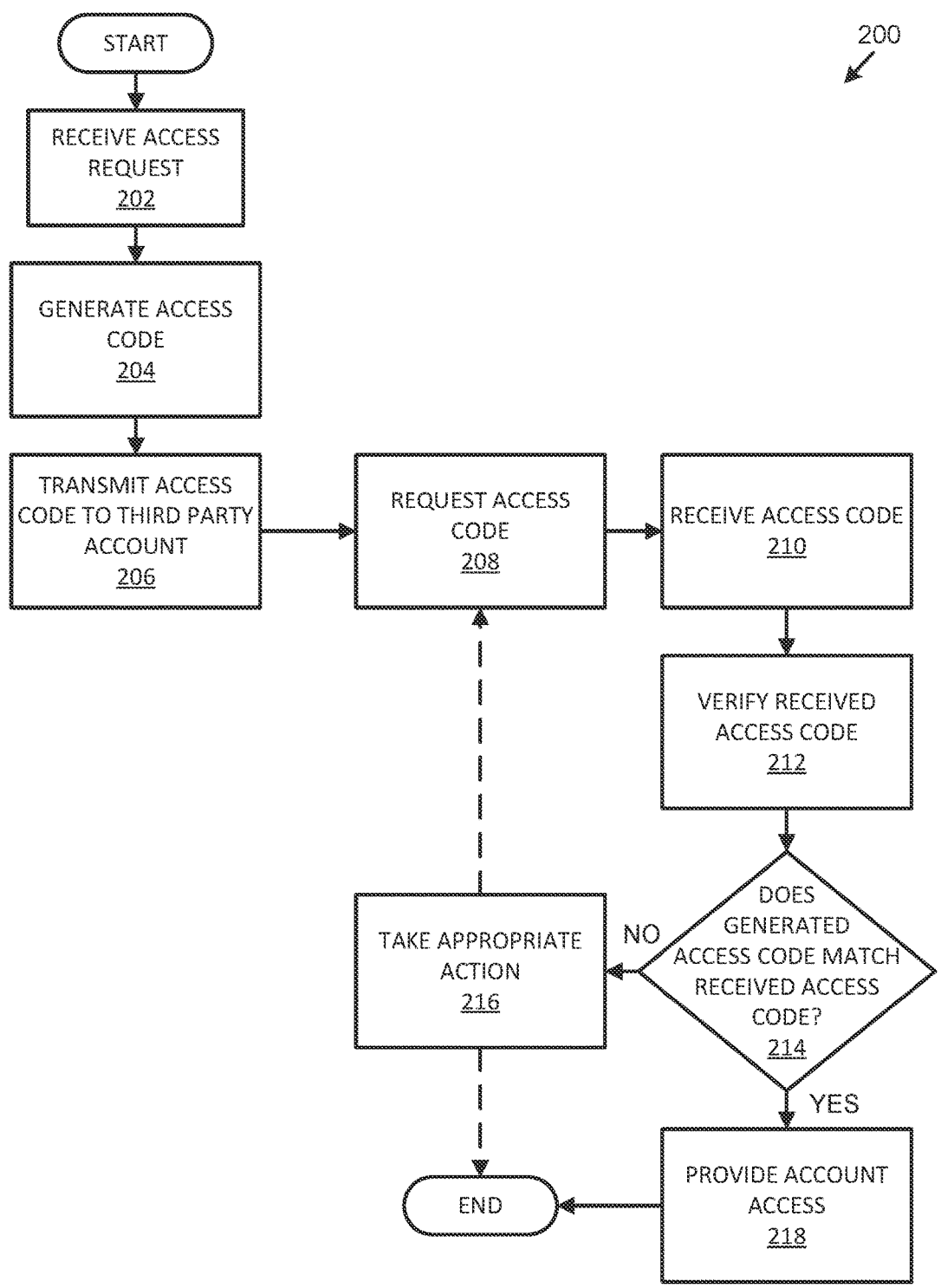
FIG 2: EXEMPLARY ACCOUNT ACCESS PROCESS – ACCOUNT SYSTEM PERSPECTIVE

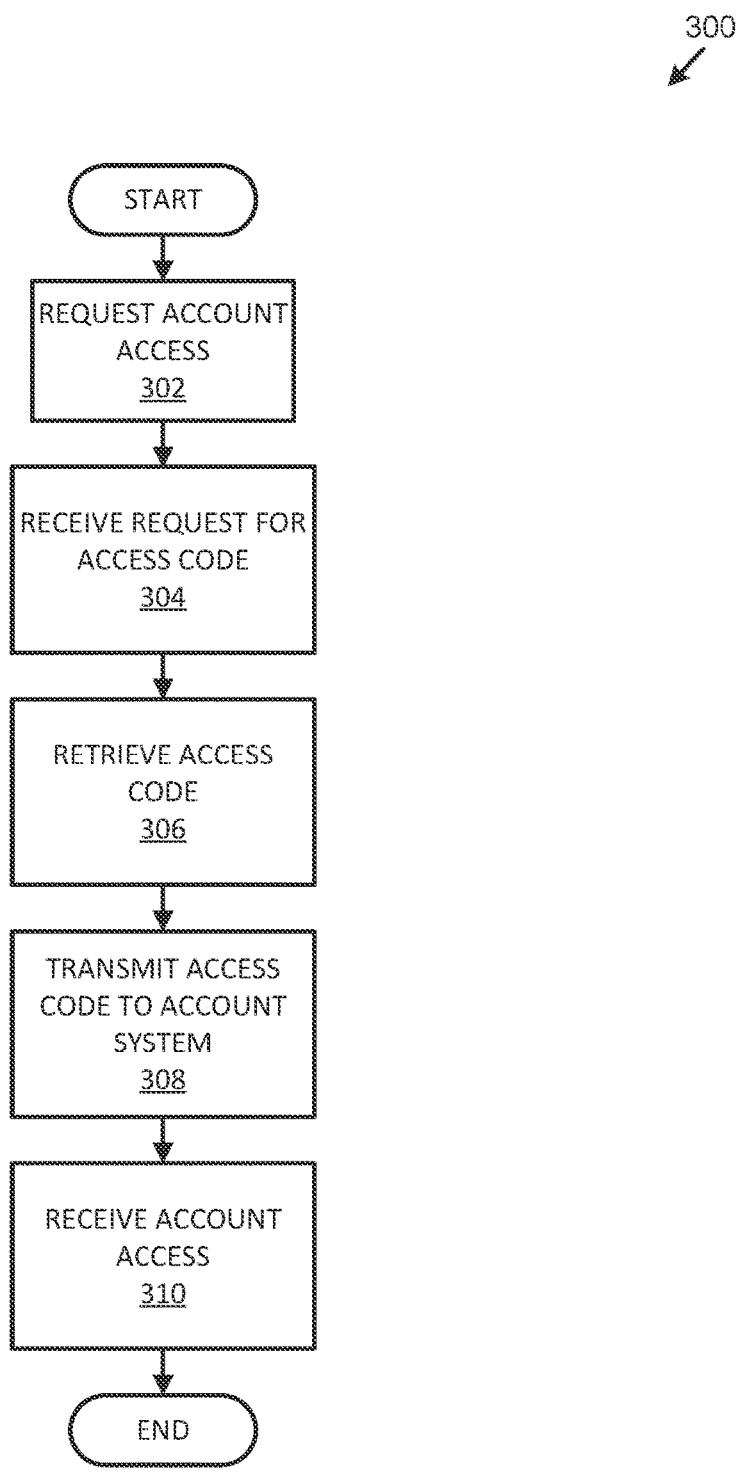
FIG 3: EXEMPLARY ACCOUNT ACCESS PROCESS – DEVICE PERSPECTIVE

SYSTEMS AND METHODS FOR IDENTITY VERIFICATION VIA THIRD PARTY ACCOUNTS

CROSS REFERENCE TO RELATED APPLICATION

This application is a continuation of U.S. patent application Ser. No. 15/955,270, filed Apr. 17, 2018, and entitled "Systems and Methods For Identity Verification Via Third Party Accounts," which claims the benefit of, and priority to U.S. Provisional Patent Application No. 62/486,210, filed on Apr. 17, 2017, and entitled "Identity Verification through Social Media Messaging & Content," the disclosures of which are incorporated by reference herein in their entirety.

TECHNICAL FIELD

The present systems and methods relate generally to identity verification and, more particularly, identity verification based on access to a third party account.

BACKGROUND

Access to sensitive electronic data is increasingly becoming a large and complex risk, financially and otherwise, for individuals, corporations, and governments alike. Malicious actors desiring to access that sensitive data employ a variety of creative methods to do so—intercepting the data in motion, impersonating authorized individuals to access the data at rest, brute-force hacking into the storage location of that data at rest, etc. Once data is encrypted, its security can be assured only so long as the access credentials for the key that decrypts the data remain secure. Access credentials (e.g., passwords, secured devices, etc.), however, regardless of the level of care taken, are almost always subject to a risk of being stolen/spoofed.

Therefore, there is a long-felt but unresolved need for a system or method that permits account access/identity verification based on access to a third party account.

BRIEF SUMMARY OF THE DISCLOSURE

Briefly described, and according to one embodiment, aspects of the present disclosure generally relate to systems and methods for account access/identity verification based on access to a third party account.

In various embodiments, the disclosed system facilitates access to a particular account via verification of the identity of the accessing user through control of a third party account. That is, in one embodiment, the system allows a user to access an account if the user can prove that he/she also has access to another account. Generally, the disclosed system improves the robustness and security of systems by ensuring that only the proper authorized individuals can access the system.

Generally, in one embodiment, the system requests that an individual who desires to access an account provide, as part of the account access process, a code or other confirmation retrieved from a third party account (e.g., social media account, etc.). In various embodiments, the system generates and transmits the code to the third party account when the user/individual attempts to access the account. Thus, upon request, the user/individual, in various embodiments, accesses the third party account, retrieves the code, and provides the code to the system as part of the account access process. In one embodiment, if the code is verified, then the individual is provided access to the account. Generally, if the code (and therefore the identity of the user) cannot be verified, then the individual will not be permitted to access the account. In this manner, the disclosed system improves the security of the systems/data by allowing access only to a live individual with access to another preauthorized account.

The system generally places no limitations on the types of accounts/data that may be accessed using this system (e.g., data in motion, in rest, documents, images, videos, email account, operating system accounts, network accounts, SaaS platform accounts, etc.). Further, the system places no limitations on the types of third party accounts that may be used to verify identity (e.g., social media such as Twitter®, Facebook®, Instagram®, Snapchat®, etc.; email accounts, etc.).

In one embodiment, a method for verifying identity of an individual attempting to access a system, comprising the steps of: receiving a request for access to the system from an electronic computing device operated by the individual; generating a unique access code corresponding to the request; transmitting the unique access code to a third party system, wherein the third party system has been preauthorized with the system to confirm the identity of the individual; receiving a third party access code from the electronic computing device, wherein the third party access code was obtained by the individual from the third party system; determining whether the third party access code matches the unique access code, wherein determining that the third party access code matches the unique access code confirms the identity of the individual; and upon determining that the third party access code matches the unique access code, providing access to the system to the electronic computing device.

In one embodiment, a system that verifies the identity of an individual attempting to access an account system, comprising: an electronic computing device operated by the individual that generates a request for access to the account system and transmits the request to the account system; the account system that receives the request for access from the electronic computing device, wherein the account system generates a unique access code corresponding to the request and transmits the unique access code to a third party system; the third party system that receives the unique access code from the account system, wherein the third party system transforms the unique access code into the third party access code; the electronic computing device that retrieves the third party access code from the third party system, wherein electronic computing device transmits the third party access code to the account system; and the account system that receives the third party access code from the electronic computing device, wherein the account system determines whether the third party access code matches the unique access code, wherein determining that the third party access code matches the unique access code confirms the identity of the individual, and, upon determining that the third party access code matches the unique access code, provides access to the account system to the electronic computing device.

According to one aspect of the present disclosure, the method, wherein the third party system is selected from the list comprising: a social media account and an email account. Furthermore, the method, wherein the system is selected from the list comprising: an email account, a network account, an operating system account, and an enterprise account. Moreover, the method, wherein the request comprises metadata regarding the request and one or more of the following: a username, a password, and/or biometric data corresponding to the individual. Further, the method, wherein the metadata is selected from the list comprising: a physical location of the electronic computing device, a timestamp for the request, and a network address for the electronic computing device. Additionally, the method, wherein the step of receiving the request further comprises the steps of: verifying the username and password are valid and correspond to an account authorized to access the system; and determining the third party system corresponding to the account to which to transmit the unique access code. Also, the method, wherein the step of verifying the username and password further comprises determining whether the metadata is within one or more predetermined parameters corresponding to the account. In addition, the method, wherein step of generating the unique access code only occurs upon determining that the metadata is within the one or more predetermined parameters. As well, the method, wherein the unique access code comprises an alphanumeric string of characters, a barcode, or a QR code. What is more, the method, further comprising the steps of: prior to determining that the third party access code matches the unique access code, determining that the third party access code does not match the unique access code; upon determining that the third party access code does not match the unique access code, requesting that the individual provide a second third party access code; and receiving the second third party access code from the electronic computing device.

According to one aspect of the present disclosure, the system, wherein the third party system is selected from the list comprising: a social media account and an email account. Furthermore, the system, wherein the account system is selected from the list comprising: an email account, a network account, an operating system account, and an enterprise account. Moreover, the system, wherein the request comprises metadata regarding the request and one or more of the following: a username, a password, and/or biometric data corresponding to the individual. Further, the system, wherein the metadata is selected from the list comprising: a physical location of the electronic computing device, a timestamp for the request, and a network address for the electronic computing device. Additionally, the system, wherein the account system, to generate the unique access code, is further operative to: verify the username and password are valid and correspond to an account authorized to access the account system; and determine the third party system corresponding to the account to which to transmit the unique access code. Also, the system, wherein the account system, to verify the username and password, is further operative to determine whether the metadata is within one or more predetermined parameters corresponding to the account. In addition, the system, wherein the account system generates the unique access code only upon determining that the metadata is within the one or more predetermined parameters. As well, the system, wherein the unique access code comprises an alphanumeric string of characters, a barcode, or a QR code. What is more, the system, wherein the account system: prior to determining that the third party access code matches the unique access code, determines that the third party access code does not match the unique access code; upon determining that the third party access code does not match the unique access code, requests a second third party access code from the electronic computing device; and receives the second third party access code from the electronic computing device.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system architecture, according to one embodiment of the present disclosure.

FIG. 2 is a flowchart showing an exemplary account access process from the account system perspective, according to one embodiment of the present disclosure.

FIG. 3 is a flowchart showing an exemplary account access process from the device perspective, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods for account access/identity verification based on access to a third party account.

In various embodiments, the disclosed system facilitates access to a particular account via verification of the identity of the accessing user through control of a third party account. That is, in one embodiment, the system allows a user to access an account if the user can prove that he/she also has access to another account. Generally, the disclosed system improves the robustness and security of systems by ensuring that only the proper authorized individuals can access the system.

Generally, in one embodiment, the system requests that an individual who desires to access an account provide, as part of the account access process, a code or other confirmation retrieved from a third party account (e.g., social media account, etc.). In various embodiments, the system generates and transmits the code to the third party account when the user/individual attempts to access the account. Thus, upon request, the user/individual, in various embodiments, accesses the third party account, retrieves the code, and provides the code to the system as part of the account access process. In one embodiment, if the code is verified, then the individual is provided access to the account. Generally, if the code (and therefore the identity of the user) cannot be verified, then the individual will not be permitted to access the account. In this manner, the disclosed system improves the security of the systems/data by allowing access only to a live individual with access to another preauthorized account.

The system generally places no limitations on the types of accounts/data that may be accessed using this system (e.g., data in motion, in rest, documents, images, videos, email account, operating system accounts, network accounts, SaaS platform accounts, etc.). Further, the system places no limitations on the types of third party accounts that may be used to verify identity (e.g., social media such as Twitter®, Facebook®, Instagram®, Snapchat®, etc.; email accounts, etc.).

Exemplary Embodiments

Referring now to the figures, for the purposes of example and explanation of the fundamental processes and components of the disclosed systems and methods, reference is made to FIG. 1, which illustrates an exemplary architecture 100 of one embodiment of the present disclosure. As will be understood and appreciated, the exemplary architecture 100 shown in FIG. 1 represents merely one approach or embodiment of the present system, and other aspects are used according to various embodiments of the present system. Generally, the disclosed system 100 facilitates account access/identity verification based on access to a third party account.

In various embodiments, the disclosed system 100 comprises an electronic computing device 101 operatively connected to an account system 103 (comprising a system database 105) and one or more third party systems 107 via a network 109 for access/identity verification based on access to a third party account. In one embodiment, the disclosed system 100 facilitates two-factor authentication, wherein a code provided from the third party account (e.g., verifying access to the third party account) serves as the second factor.

For example, in one non-limiting embodiment, an individual wants to access an email account 103 using his/her laptop 101. Generally, the individual provides his/her login credentials, which are verified by the email account 103. In one embodiment, the email account 103 generates and transmits an identity verification code to a pre-verified third party account 107 and requests that the individual provide the identity verification code. Thus, the individual navigates to the third party account 107, retrieves the identity verification code, and provides it to the email account 103. Once validity of the identity verification code is confirmed, in one embodiment, the individual is provided access to the email account 103 via the laptop 101. Generally, if the identity verification code cannot be validated, then the individual will not be permitted to access the email account 103, the attempt will be logged, the process starts over, an error message is displayed, etc. In this manner, the disclosed system improves the security of systems/data by allowing access only to an individual with access to another preauthorized account.

Generally, the electronic computing device 101 is any device that is capable of performing the functionality disclosed herein (e.g., desktop computer, laptop computer, tablet computer, smartphone, smartwatch, etc.). In various embodiments, the electronic computing device 101 communicates via network 109 with the account management system 103 and the third party system 107 as part of the processes 200 and 300. In one embodiment, the electronic computing device 101 is the device through which the user is attempting to access the account system 103.

Generally, the account system 103 may be any computing device (e.g., desktop computer, laptop, servers, tablets, etc.), combination of computing devices, software, hardware, or combination of software and hardware that is capable of performing the functionality disclosed herein. In various embodiments, the account system 103 is operatively connected to the electronic computing device 101 and third party systems 107 via the network 109 to conduct the processes/analyses disclosed herein. In one embodiment, the account system 103 further comprises the system database 105. Generally, the system database 105 may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In one embodiment, the system database 105 is local to the account system 103 (e.g., the account system 103 comprises the system database 105, etc.). In other embodiments, the system database 105 is virtual or stored in the "cloud." In one embodiment, the account system 103 comprises a plugin that operates within and controls the access to the account. In one embodiment, the account operates as part of a separate SaaS platform into which the plugin is integrated.

Generally, the third party system 107 may be any computing device (e.g., desktop computer, laptop, servers, tablets, etc.), combination of computing devices, software, hardware, or combination of software and hardware that is capable of performing the functionality disclosed herein. In various embodiments, the third party system 107 communicates via network 109 with the electronic computing device 101 as part of the processes 200 and 300. In one embodiment, the third party system 107 receives a confirmation code from the account system 103. In various embodiments, the third party system 107 may be a social media account (e.g., Twitter®, Facebook®, Instagram®, Snapchat®, etc.), email account, etc. Generally, the third party system 107 has no relationship with the account system 103 other than the third party system 107 has been previously identified by the owner of the account in the account system 103 and a method of contact the third party system 107 has been provided/established between the third party system 107 and the account system 103.

Generally, the network 109 may be any connection capable of transferring data between two or more computer systems (e.g., a secure or unsecured connection, Bluetooth, wireless or wired local-area networks (LANs), cell network, the Internet, etc.).

FIG. 2 is a flowchart showing an exemplary account access process 200 from the account system 103 perspective, according to one embodiment of the present disclosure. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown. Generally, the exemplary account access process 200 is the process by which account access/identity verification is facilitated based on access to a third party account.

In various embodiments, the exemplary account access process 200 begins at step 202, wherein the system receives a request for access (e.g., from a user on electronic computing device 101). In one embodiment, the request for access may comprise login credentials (e.g., username and password, biometric data, liveness-verified data, etc.) that the system verifies as part of step 202. Generally, at step 204, the system generates an access code to verify the user's identity and that the user has authorization to access the account. This disclosure generally places no limitations on the format/type of access code that may be used (e.g., alphanumeric code, QR code, barcode, hyperlink, etc.). Thus, at step 206, the system transmits the generated access code to the third party account. This disclosure generally places no limitations on how the access code may be transmitted to third party account 107 (e.g., email, text message, chat message, etc.).

At step 208, in various embodiments, the system requests the user provide the access code. In one embodiment, at step 210, the system receives the access code from the user (e.g., manual entry by the user after the user retrieves it from the third party system, the system automatically pulls the access code through an interface with the third party system, etc.). Accordingly, at steps 412 and 414, the system verifies the access code received from the user (at step 210) to determine whether it matches the code generated and transmitted to the third party account (at steps 204 and 206). If the codes do not match, then, at step 216, in various embodiments, the system takes an appropriate action—for example, the system may request the code from the user again (e.g., by returning to step 208), the system may decline access to the account and terminate the process 200 thereafter, the system may log information regarding the denied access for later analysis, the system may alert security personnel, etc. If the codes do match, however, the system, at step 218, in various embodiments, provides access to the user.

After providing access at step 218 (or taking the appropriate action at step 216), the exemplary account access process 200 ends thereafter.

FIG. 3 is a flowchart showing an exemplary account access process 300 from the device 101 perspective, according to one embodiment of the present disclosure. Generally, the exemplary account access process 300 is the process by which account access/identity verification is facilitated based on access to a third party account. In various embodiments, the exemplary account access process 300 occurs simultaneous to the exemplary account access process 200.

In various embodiments, at step 302, the user requests account access (e.g., providing login credentials, etc., using electronic computing device 101) from the account system 103. At step 304, in one embodiment (e.g., if the login credentials were verified, etc.), the user receives a request for provision of the access code. Generally, the request for the access code may include instructions for the user to follow to receive the code or may permit the user to select the third party account to which the code is transmitted. Thus, at step 306, the user accesses the third party account 107 and retrieves the access code (e.g., sent from the account system at step 206 in FIG. 2) and, at step 308, provides the access code to the account system (e.g., manually or digitally copying the same). In one embodiment (e.g., if the access code was verified, etc.), at step 310 the user receives access to the account system 103.

After receiving account access at step 310, the exemplary account access process 300 ends thereafter.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method, comprising the steps of: receiving a request for access to a system from an electronic computing device operated by an individual, the request comprising (i) metadata corresponding to the electronic computing device operated by the individual and (ii) an identifying credential corresponding to the individual;

verifying the identifying credential is valid and corresponds to an account authorized to access the system by determining whether the metadata is within one or more predetermined parameters corresponding to the account;

transmitting a unique access code to a particular third party system, wherein the particular third party system is preauthorized with the system to confirm an identity of the individual;

receiving a third party access code, wherein receiving the third party access code comprises the individual accessing the particular third party system by navigating to the particular third party system via the electronic computing device, retrieving the third party access code from the particular third party system, and manually providing the third party access code to the system via the electronic computing device;

determining that the third party access code does not match the unique access code, wherein the third party access code and the unique access code are determined to match in response to determining that the third party access code and the unique access code are identical:

upon determining that the third party access code does not match the unique access code, requesting that the individual provide a second third party access code;

receiving the second third party access code from the electronic computing device; and providing access to the system to the electronic computing device in response to determining that the second third party access code matches the unique access code.

2. The method of claim 1, wherein the particular third party system is selected from a list comprising: a social media account and an email account.

3. The method of claim 1, wherein the system is selected from a list comprising: an email account, a network account, an operating system account, and an enterprise account.

4. The method of claim 1, wherein the identifying credential corresponding to the individual comprises a username, a password, biometric data, or liveness verified data corresponding to the individual.

5. The method of claim 1, wherein the metadata corresponding to the electronic computing device comprises a physical location of the electronic computing device at the time of the request for access, a timestamp corresponding to the request for access, and a network address associated with the electronic computing device.

6. The method of claim 1, wherein the method further comprises the step of generating the unique access code upon determining that the metadata is within the one or more predetermined parameters.

7. The method of claim 1, wherein the unique access code comprises an alphanumeric string of characters.

8. A system, comprising:
an electronic computing device operated by an individual, the electronic computing device comprising a first processor and memory and being operatively configured to (i) generate a request for access to an account system and (ii) transmit the request to the account system, the request comprising (i) metadata corresponding to the electronic computing device operated by the individual and (ii) an identifying credential corresponding to the individual;
the account system comprising a second processor and memory and being operatively configured to:
receive the request for access from the electronic computing device;
verify the identifying credential is valid and corresponds to an account authorized to access the account system by determining whether the metadata is within one or more predetermined parameters corresponding to the account; and
transmit the unique access code to a particular third party system and wherein the particular third party system is preauthorized with the account system to confirm an identity of the individual;
the particular third party system that receives the unique access code from the account system;
the electronic computing device comprising the first processor and memory that is further operatively configured to execute user instructions to access the particular third party system, wherein accessing the particular third party system comprises the individual navigating to the particular third party system via the electronic computing device and retrieving the third party access code from the particular third party system, and wherein the individual manually provides the third party access code to the account system via the electronic computing device; and
the account system comprising the second processor and memory that is further operatively configured to:
receive the third party access code from the electronic computing device;
determine that the third party access code does not match the unique access code, wherein the third party access code and the unique access code are determined to match in response to determining that the third party access code and the unique access code are identical;
upon determining that the third party access code does not match the unique access code, request a second third party access code from the electronic computing device;
receive the second third party access code from the electronic computing device; and
provide access to the account system to the electronic computing device in response to determining that the second third party access code matches the unique access code.

9. The system of claim 8, wherein the particular third party system is selected from a list comprising: a social media account and an email account.

10. The system of claim 8, wherein the account system is selected from a list comprising: an email account, a network account, an operating system account, and an enterprise account.

11. The system of claim 8, wherein the identifying credential corresponding to the individual comprises a username, a password, biometric data, or liveness verified data corresponding to the individual.

12. The system of claim 8, wherein the metadata corresponding to the electronic computing device comprises a physical location of the electronic computing device at the time of the request for access, a timestamp corresponding to the request for access, and a network address associated with the electronic computing device.

13. The system of claim 8, wherein the account system comprising the second processor and memory is further operatively configured to generate the unique access code upon determining that the metadata is within the one or more predetermined parameters.

14. The system of claim 8, wherein the unique access code comprises an alphanumeric string of characters.

15. A non-transitory computer-readable medium comprising instructions that, when executed by a processor, cause the processor to:
receive a request for access to a system from the electronic computing device operated by an individual, the request comprising (i) metadata corresponding to the electronic computing device operated by the individual and (ii) an identifying credential corresponding to the individual;
verify the identifying credential is valid and corresponds to an account authorized to access the system by determining whether the metadata is within one or more predetermined parameters corresponding to the account;
transmit a unique access code to a particular third party system, wherein the particular third party system is preauthorized with the system to confirm an identity of the individual;
receive a third party access code, wherein receiving the third party access code comprises the individual accessing the particular third party system by navigating to the particular third party system via the electronic computing device, retrieving the third party access code from the particular third party system, and manually providing the third party access code to the system via the electronic computing device;
determine that the third party access code does not match the unique access code, wherein the third party access code and the unique access code are determined to match in response to determining that the third party access code and the unique access code are identical;

upon determining that the third party access code does not match the unique access code, request a second third party access code from the electronic computing device;

receive the second third party access code from the electronic computing device; and provide access to the system to the electronic computing device in response to determining that the second third party access code matches the unique access code.

16. The non-transitory computer readable medium of claim 15, wherein the instructions are further executable by the processor to cause the processor to:

generate the unique access code upon determining that the metadata is within the one or more predetermined parameters.

\* \* \* \* \*